US008667036B2

(12) United States Patent
Gandolph et al.

(10) Patent No.: US 8,667,036 B2
(45) Date of Patent: *Mar. 4, 2014

(54) BONDING CONTENTS ON SEPARATE STORAGE MEDIA

(75) Inventors: Dirk Gandolph, Ronnenberg (DE); Jobst Hoerentrup, Hannover (DE); Ralf Ostermann, Hannover (DE); Carsten Herpel, Wennigsen (DE); Uwe Janssen, Seelze (DE); Hartmut Peters, Barsinghausen (DE); Andrej Schewzow, Hannover (DE); Marco Winter, Hannover (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,163

(22) Filed: Jul. 16, 2012

(65) Prior Publication Data
US 2012/0284521 A1 Nov. 8, 2012

Related U.S. Application Data

(62) Division of application No. 11/667,167, filed as application No. PCT/EP2005/055501 on Oct. 25, 2005, now abandoned.

(30) Foreign Application Priority Data

Nov. 9, 2004 (EP) ..................................... 04026516

(51) Int. Cl.
*G06F 12/00* (2006.01)
*G06F 17/30* (2006.01)

(52) U.S. Cl.
USPC .......................................... 707/831; 707/821

(58) Field of Classification Search
None
See application file for complete search history.

(56) References Cited

U.S. PATENT DOCUMENTS

| 5,473,584 | A | 12/1995 | Oshima |
| 5,644,782 | A | 7/1997 | Yeates et al. |
| 6,757,827 | B1 | 6/2004 | Geist |
| 6,785,786 | B1 | 8/2004 | Gold et al. |
| 6,958,382 | B2 | 10/2005 | Lange et al. |
| 6,959,382 | B1 | 10/2005 | Kinnis et al. |
| 6,976,165 | B1 | 12/2005 | Carpentier et al. |

(Continued)

FOREIGN PATENT DOCUMENTS

| JP | 10116472 | 5/1998 |
| JP | 10510660 | 10/1998 |

(Continued)

OTHER PUBLICATIONS

B. Schneier: "Applied Cryptography" 1996, John Wiley & Sons, New York, pp. 185-187; 483-494.

*Primary Examiner* — Ajay Bhatia
*Assistant Examiner* — Jessica N Le
(74) *Attorney, Agent, or Firm* — Robert D. Shedd; Jeffrey M. Navon

(57) ABSTRACT

Local storage on player instruments provides the ability for adding further amendments and most recent supplements to the optical disc content. A problem arising with this technically applicable possibility is the protection of copyrights bound to disc and supplement data. The present invention describes a technique to ensure a security framework that is able to handle this, by creating a virtual file system (VFS) by merging optical disc data and local storage data based upon a common identifier.

1 Claim, 13 Drawing Sheets

(56) References Cited

U.S. PATENT DOCUMENTS

| | | | |
|---|---|---|---|
| 7,136,487 B1 | 11/2006 | Schon et al. | |
| 7,769,920 B2 * | 8/2010 | Kimura et al. | 710/36 |
| 7,813,512 B2 * | 10/2010 | Futa et al. | 380/285 |
| 2002/0051641 A1 | 5/2002 | Nagaoka | |
| 2002/0116633 A1 | 8/2002 | Kobayashi et al. | |
| 2002/0194337 A1 | 12/2002 | Knight et al. | |
| 2003/0079222 A1 * | 4/2003 | Boykin et al. | 725/31 |
| 2003/0120923 A1 * | 6/2003 | Gilman et al. | 713/170 |
| 2003/0126432 A1 | 7/2003 | Tonisson | |
| 2003/0135744 A1 | 7/2003 | Almeida | |
| 2003/0182552 A1 * | 9/2003 | Tanimoto et al. | 713/170 |
| 2003/0228141 A1 | 12/2003 | Ballantyne | |
| 2004/0003239 A1 | 1/2004 | Ohmori et al. | |
| 2004/0039926 A1 * | 2/2004 | Lambert | 713/189 |
| 2004/0109569 A1 | 6/2004 | Ellison et al. | |
| 2004/0175000 A1 | 9/2004 | Caronni | |
| 2004/0194027 A1 * | 9/2004 | Suzuki et al. | 715/515 |
| 2004/0266533 A1 * | 12/2004 | Gentles et al. | 463/42 |
| 2005/0044045 A1 | 2/2005 | Pelly et al. | |
| 2005/0071351 A1 | 3/2005 | Gotoh | |
| 2005/0078825 A1 * | 4/2005 | Ohmori et al. | 380/255 |
| 2005/0102499 A1 * | 5/2005 | Kosuga et al. | 713/152 |
| 2005/0131900 A1 * | 6/2005 | Palliyll et al. | 707/10 |
| 2005/0131998 A1 * | 6/2005 | Takashima | 709/203 |
| 2005/0138397 A1 | 6/2005 | Kusudo et al. | |
| 2005/0138401 A1 | 6/2005 | Terao et al. | |
| 2005/0154747 A1 | 7/2005 | Kii et al. | |
| 2005/0180573 A1 * | 8/2005 | Pelly et al. | 380/277 |
| 2005/0228835 A1 | 10/2005 | Roa | |
| 2005/0262149 A1 | 11/2005 | Jung et al. | |
| 2006/0074912 A1 | 4/2006 | Borthakur et al. | |
| 2006/0098936 A1 * | 5/2006 | Ikeda et al. | 386/46 |
| 2006/0098940 A1 | 5/2006 | Seo et al. | |
| 2006/0140091 A1 * | 6/2006 | Iwamoto et al. | 369/53.2 |
| 2006/0204092 A1 | 9/2006 | Hamasaka et al. | |
| 2006/0245307 A1 | 11/2006 | So et al. | |
| 2006/0282612 A1 | 12/2006 | Ikeda et al. | |
| 2007/0027873 A1 | 2/2007 | Factor et al. | |
| 2007/0033419 A1 * | 2/2007 | Kocher et al. | 713/193 |
| 2007/0036521 A1 | 2/2007 | Date et al. | |
| 2007/0053659 A1 * | 3/2007 | Kiyama et al. | 386/95 |
| 2007/0086727 A1 | 4/2007 | Tanaka et al. | |
| 2007/0086749 A1 | 4/2007 | Isobe et al. | |
| 2007/0136282 A1 | 6/2007 | Takashima | |
| 2007/0150735 A1 * | 6/2007 | Futa et al. | 713/171 |
| 2007/0206920 A1 | 9/2007 | Hirose et al. | |
| 2007/0274180 A1 * | 11/2007 | Kato et al. | 369/47.16 |
| 2007/0277005 A1 | 11/2007 | So et al. | |
| 2007/0286575 A1 | 12/2007 | Oashi et al. | |
| 2007/0286577 A1 | 12/2007 | Kato et al. | |
| 2008/0025182 A1 | 1/2008 | Seo et al. | |
| 2008/0031601 A1 | 2/2008 | Hashimoto et al. | |
| 2008/0279525 A1 | 11/2008 | Kim et al. | |
| 2010/0014832 A1 * | 1/2010 | Ikeda et al. | 386/95 |
| 2010/0046747 A1 * | 2/2010 | Oashi et al. | 380/30 |
| 2011/0305435 A1 * | 12/2011 | Tanaka et al. | 386/259 |
| 2012/0005481 A1 * | 1/2012 | Kusudo et al. | 713/175 |

FOREIGN PATENT DOCUMENTS

| | | |
|---|---|---|
| JP | 11073348 | 3/1999 |
| JP | 2002319935 | 10/2002 |
| JP | 2003234737 | 8/2003 |
| JP | 2004146052 | 5/2004 |
| JP | 2004313367 | 11/2004 |
| WO | WO9713248 | 4/1997 |
| WO | WO2005041050 | 5/2005 |

* cited by examiner

Roles and responsibilities

Roles and Responsibilities - VFS Construction

Users allow or prevent VFS construction by user preferences

Player constructs VFS if it has local storage and the binding unit data on the local storage is consistent according to the VFS rule set Content authors enable VFS construction by following the VFS rule set

When to construct the VFS ?

- Upon Disc Insertion
  - Simplest from Player implementation point, but does not allow download and subsequent playback of downloaded content while the disc is inserted.

- Upon Disc Insertion and Title Change
  - Good choice, because Title Change is always non-seamless, Playlists, Clip Information and Movie(?)/Java Objects need to be loaded anyway

- Upon Playback Start
  - Would work for PlayList, ClipInfo and M2TS files, but requires different VFS construction mechanism for downloaded MovieObjects and BD-J Objects

- Dynamic (API call)
  - Possible for BD-J if there is no playback running that would potentially be interrupted, but not applicable to HDMV

Fig. 12

What would be a good Binding Unit ?

- Per Disc
  - Simplest from Player implementation point, but does not allow download and subsequent playback of downloaded content while the disc is inserted.
- Per Title
  - Best fit for a title based VFS construction framework
- Per PlayList
  - Works for PlayList, ClipInfo and M2TS files, but requires separate binding unit concept for MovieObject, BD-J Object File updates
- Dynamic (API call)
  - Possible for BD-J if there is no playback running that would potentially be interrupted, but not applicable to HDMV

Fig.13

How to check integrity of VFS ?

- The integrity of the VFS needs to be checked by the player every time before the VFS is constructed
  - Goals:
    - ➤ Avoid use of corrupted data (e.g. corrupted during download)
    - ➤ Avoid use of partially downloaded content (incomplete binding unit)
    - ➤ Make sure that only authorized content is used for the VFS (don't sneak Studio A's content into Studio B's VFS)
  - Possible Solution
    - ➤ Hash Codes are good to detect corruption within a single file
    - ➤ Have a list of all files belonging to the Binding Unit
    - ➤ Signatures could be used for authorization

Fig. 14

Binding Shared Trailers to Discs

- Adding a Trailer to a disc requires updating the Index File
  - This could be done individually for every disc on local storage

- Content Authors have 2 choices:
  - Downloading new Index Files for every Disc
    - ➤ Index Files are very short ➔ Quick downloads
  - Have a Java application change the Index Files for every Disc
    - ➤ Index File structure is very simple ➔ No big deal

Fig. 17

BONDING CONTENTS ON SEPARATE STORAGE MEDIA

This application is a divisional of U.S. application Ser. No. 11/667,167, filed May 4, 2007 now abandoned, herein incorporated by reference.

FIELD OF THE INVENTION

This invention relates to a method and an apparatus for securely binding contents on a local storage medium to contents on a removable storage medium. In particular, the removable storage medium is a read-only optical disc.

BACKGROUND

Future optical disc formats will demand local storage on the player instruments. This is because content, carried e.g. on a read-only optical disc, very soon becomes outdated, and the content producing studios intend to increase the attractiveness of their products. Local storage on player instruments provides the ability for adding further amendments and most recent supplements to the optical disc content, without increasing the disc production costs, as would be necessary for writable discs. When connected to the Internet, it is possible to download supplements to the local storage, or to replace content of the read-only disc. E.g. it is possible to replace an outdated movie trailer by a new one, or to supplement disc content by further audio or subtitle tracks. Also executable code, like a game bound to a particular optical disc, can be downloaded and run on the instrument while the associated disc is in the player.

A problem arising with this technically applicable possibility is the protection of copyrights bound to disc and supplement data. It is desirable to preserve copyrights in such a way that downloaded supplement data can be exclusively used when the related optical disc is inserted within the playback instrument. Any usage of supplement data stemming from the content provider, also a usage independent from the dedicated optical disc, should be under the control of the content owner, i.e. the content provider. The content provider wants to be sure that all of his content, whether it comes from the disc or it has been stored on local storage, cannot be used illegally or accidentally without having the disc, or in any combination with other content.

Usually data from local storage and from optical disc storage are mounted together into a virtual file system (VFS) within a player. This is done only once, namely when inserting the disc and starting the first application. Any further application start is based upon that virtual file system. This is a security risk, because even when data access is restricted, content becomes visible to foreign applications.

SUMMARY OF THE INVENTION

The present invention describes a technique to ensure a security framework that is able to handle the described generalized scenario. Advantageously, it includes also cases in which applications from different authors are located on a single optical disc, e.g. DVD, Blu-ray disc or the like.

The gist of the present invention is to create a virtual file system (VFS) by merging optical disc data and local storage data based upon a common identifier. This identifier is called herein "organization_ID". It is used for certifying content. The creation of the VFS is executed dynamically before starting any application, e.g. playback of a title. Therefore VFS generation may vary during the presentation of an optical disc, because the included local storage data and optical disc data are changing according to the relations within a title. The location and handling of the organization_ID is embedded within a security framework, which in principle is application specific.

A local storage of a player instrument may contain data coming from different content providers. According to the invention, these data have different organization_IDs, indicating their respective content provider. In a more generalized application also the optical disc may contain titles coming from different content providers, and thus being certified with different organization_IDs. A VFS is generated according to the title that is played back on the playback instrument, immediately before starting the playback. In this way, any uncontrolled data combination is excluded, independent from if the data come from a local storage or from an optical disc, or removable storage device in general. The transparency for updates on local storage, as well as its dynamic usage for temporary data is preserved.

An apparatus that utilizes the method is disclosed in claim 2.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 signature generation and verification;

FIG. 12 when to construct the Virtual File System;

FIG. 13 arguments for selecting a binding unit;

FIG. 14 how to check the integrity of a Virtual File System;

FIG. 17 binding of shared trailers to discs.

DETAILED DESCRIPTION OF THE INVENTION

The invention is based upon the usage of a security framework, which incorporates an organization_ID for the identification of matching files that may be distributed e.g. on a first, local storage medium, e.g. hard-disc drive (HDD), and on a second, removable medium. In the following, it is assumed that the second, removable storage medium is a read-only optical disc. It may however be any removable storage medium, e.g. flash memory or the like. When inserting the optical disc in the player instrument, a virtual file system (VFS) is compiled. The selection of files to compile is based upon the performed title and its organization_ID. In the following, the term "organization_ID" is used to explain the general concept. In other embodiments it is possible to define further sub-structures like e.g. disc ID or application ID, where parts of a disc can use a finer granularity of the organization_ID.

Figure 1:
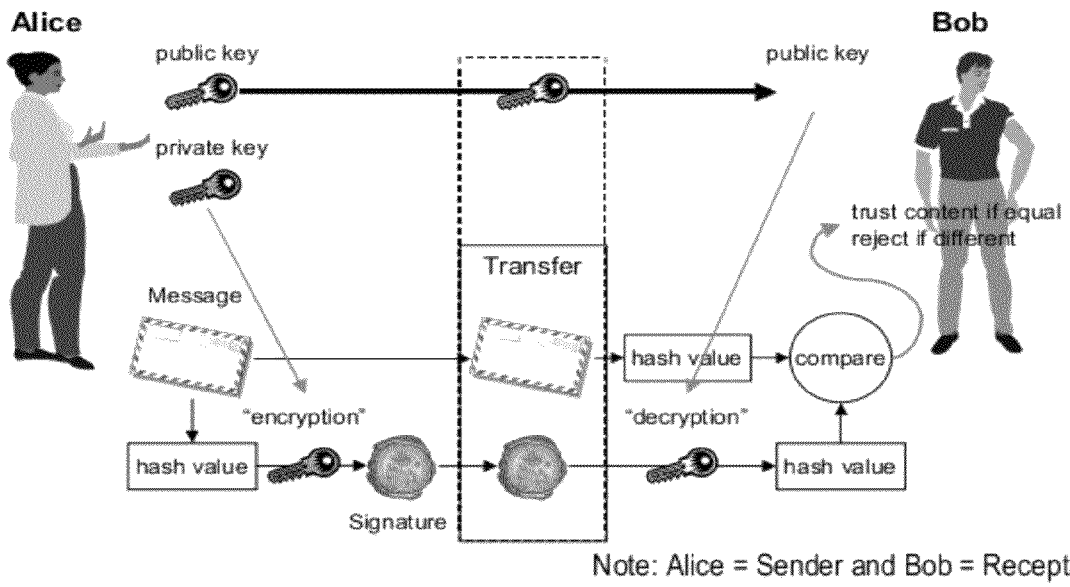

A typical security framework is based upon the usage of asymmetric encryption, the elements of signature and the certificate. FIG. 1 depicts the usage of a signature to ensure the receptor of the authenticity of a message, or data set in general. A sender ("Alice") of a message has a private key, which she uses to encrypt a hash-value generated automatically from the contents of the message. The encrypted hash-value is called a "signature", and is transmitted together with the message to be secured. A receptor ("Bob") may only open the message if he may generate a hash-value from the message that is identical with the received signature. For this purpose the receptor uses a pre-defined algorithm for generating the hash-value from the received message, and the public key of the sender for decrypting the signature. The sender may publicly distribute this key, since it is different from her private key. The public key is suitable for decrypting data that were encrypted with the corresponding private key. The receptor who knows the public key of the sender can verify the signature, i.e. the received encrypted hash-value. Only if the receptor-generated hash-value and the decrypted signature are identical, the receptor can be sure that the message has not been modified in the meantime.

Figure 2:
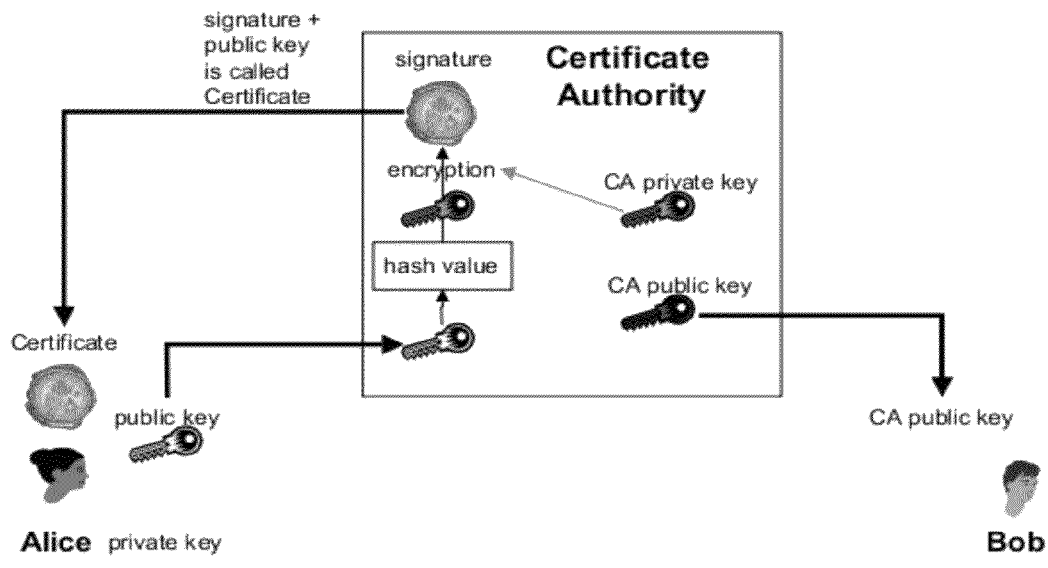
FIG. 2 generation of a certificate by a trusted third party certificate authority.

To avoid the effort of sending public keys around, which is again a security risk as well as a key management overhead, the technique of certification is used. As FIG. 2 shows, a trusted third party authority (Certificate Authority, CA) signs the public key of a client ("Alice"). This is done by generating a hash-value of the public key, encrypting it with the CAs private key and sending the encrypted hash-value back to the client. This signature, together with the client's public key, is forming the certificate to be used. According to the present invention, further information is added and included within the certificate, particularly an identifier like e.g. the organization_ID.

Figure 3:
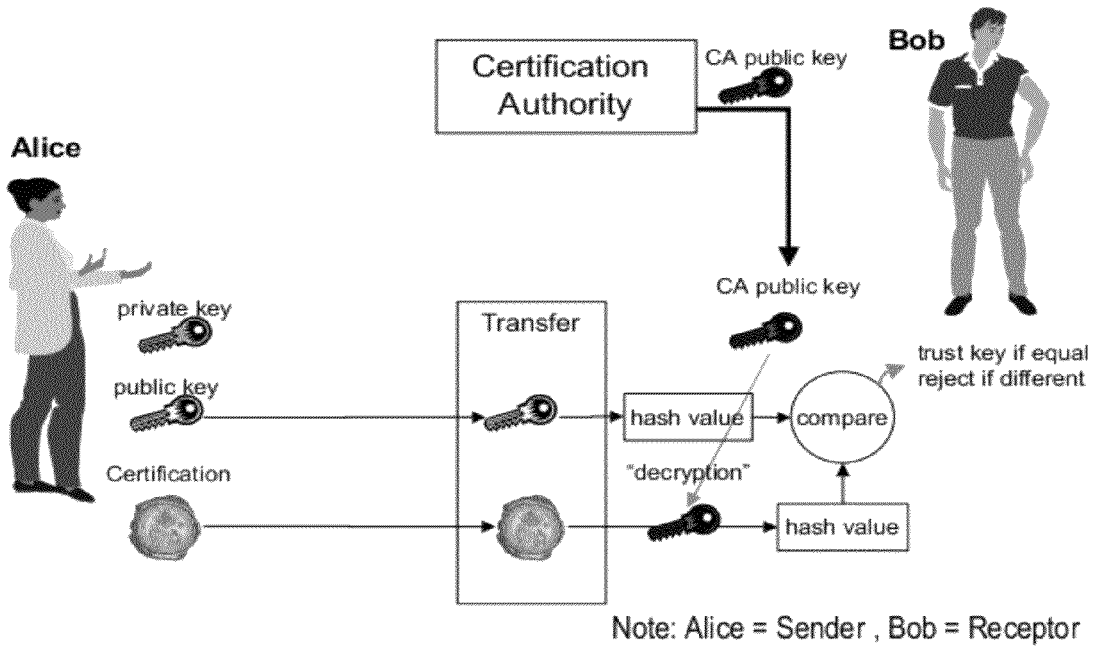
FIG. 3 verification of the certificate for a public key.

The receptor ("Bob") can verify if the senders public key is authentic if he has the CAs public key. FIG. 3 depicts the verification of the certificate for Alice's key. The receptor can verify the authenticity of a received public key, even if it belongs to a previously unknown sender, by decrypting the certificate with the trusted third party public key. Only if the regenerated hash-value from the received public key matches the decrypted certificate, the received public key from the sender can be trusted.

Figure 4:
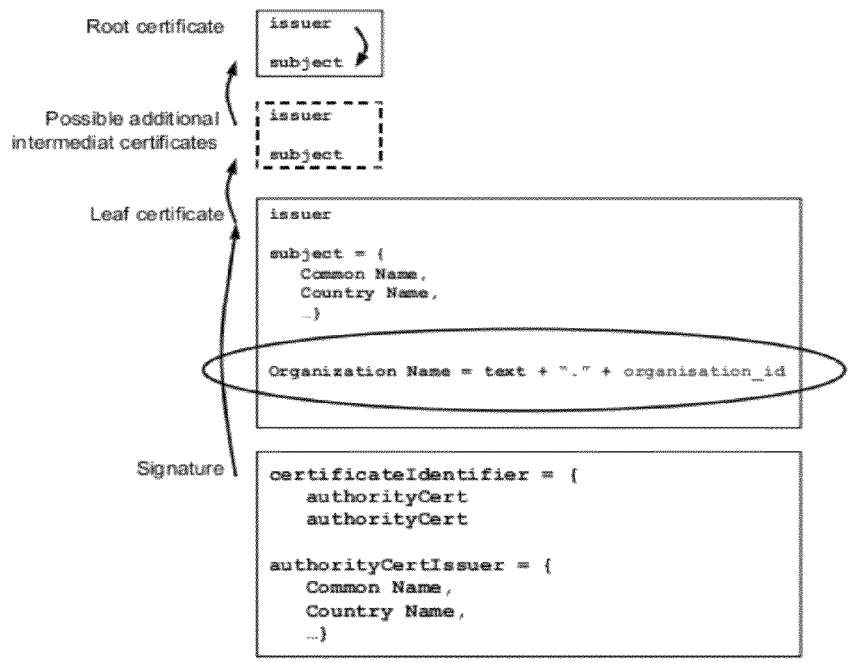
FIG. 4 usage of organization_ID within a security framework.

As shown in FIG. 4, the invention can be used based on a general security framework. For data on optical disc and local storage, signatures are generated that incorporate certificates and carry the organization_ID. Signature certification proofs authenticity of the signature and also that of the organization_ID. The invention includes that the local storage is permanent, i.e. stored data are not lost after power-down, and all files stored to it are kept, whether they come from the disc, via Internet download or from other sources.

Figure 5:
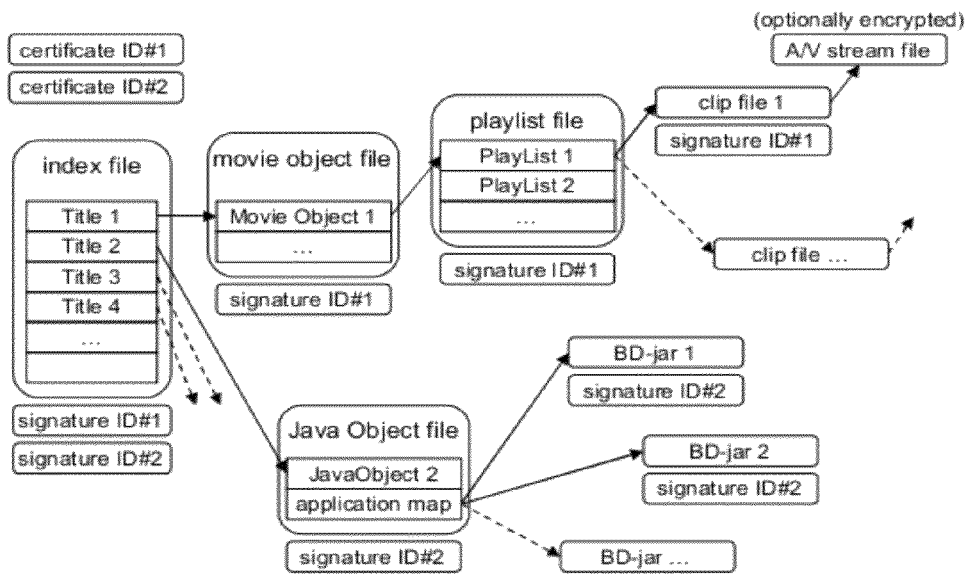
FIG. 5 certificates applied to different files carrying two different organization_IDs according to their mapping in a virtual file system.

FIG. 5 shows the utilization of such security framework for a disc file system according to the invention, wherein the assembling of a VFS controlled by the organization_ID is applied. The certificates certificate_ID#1,#2 are carrying the respective organization_IDs, and the signature files firmly bound to the actual data content are pointing at their certificates. The semantic binding between signature files and data content is achieved by the so-called "digest code", i.e. a code that is generated by applying a defined algorithm on the data content. The physical binding between signature and data may be realized by a file structure or a manifest file. The files depicted in FIG. 5 are e.g. all located on an optical disc, i.e. the disc carries titles authored by two different content providers that have different certificates and different signature identifiers signature_ID#1,#2.

Before starting the presentation of e.g. Title_1, the player compiles a virtual file system VFS. The compilation is ruled by the certificates certificate ID#1,2 assigned to the signature belonging to the data on disc. In the example it is assumed that the signature signature_ID#1 attached to the title Title_1 is certified by organization_ID#1. Therefore, according to the invention, only data certified by organization_ID#1 may be assembled before starting the presentation of Title_1. Likewise, only data certificated by organization_ID#2 may be assembled for a VFS before starting the presentation of e.g. Title_2 that is certified by an organization_ID#2. The different organization_IDs may belong to different content creators or owners, i.e. content authors, studios, providers etc.

As depicted in FIG. 5, the titles mentioned above may encompass e.g. movie object files (MovieObjects) or Java object files (JavaObjects), or other types of files. MovieObjects describe streaming files for audio and/or video (AV) presentations, and JavaObjects describe Java executables that may run on a Java Virtual Machine (JVM). Java object data are stored in Java archive files BD-jar1, BD-jar2. Both object types may have a certificated signature file.

A possible exception is the treatment of AV stream files, because they need not necessarily have a signature file. This is because stream files are large, and the digest code (i.e. hash-code) calculation of a large file takes long. For the assembling of the VFS, signed AV stream files are treated in the same way as explained above for other files. But the assembling process will include also those AV stream files that are not signed at all, i.e. only those stream files are included that are either certified with the correct organization_ID, or have no signature at all. This treatment of AV stream files does not break the security chain, because any access to AV stream files is only possible by means of the MovieObject, PlayList and Clip files. Those files are always signed and certified, directly or indirectly.

In another embodiment of the invention, the organization_ID is applied for the whole disc. In this case, the VFS is generated only once before starting the disc presentation. The difference versus state-of-the-art systems becomes clear when the local storage is considered.

According to the invention, the data that belongs to a disc and that is stored on the local storage medium is carrying a signature and a certificate, which includes the organization_ID. For AV stream files the above-mentioned exception remains valid. All uncertified data on local storage can only run separately, i.e. the virtual file system generated from it cannot include any certified, or differently certified, disc content. Thus, the content provider can be sure that his content is secure, and none of the data material on disc is misused.

Figure 6:
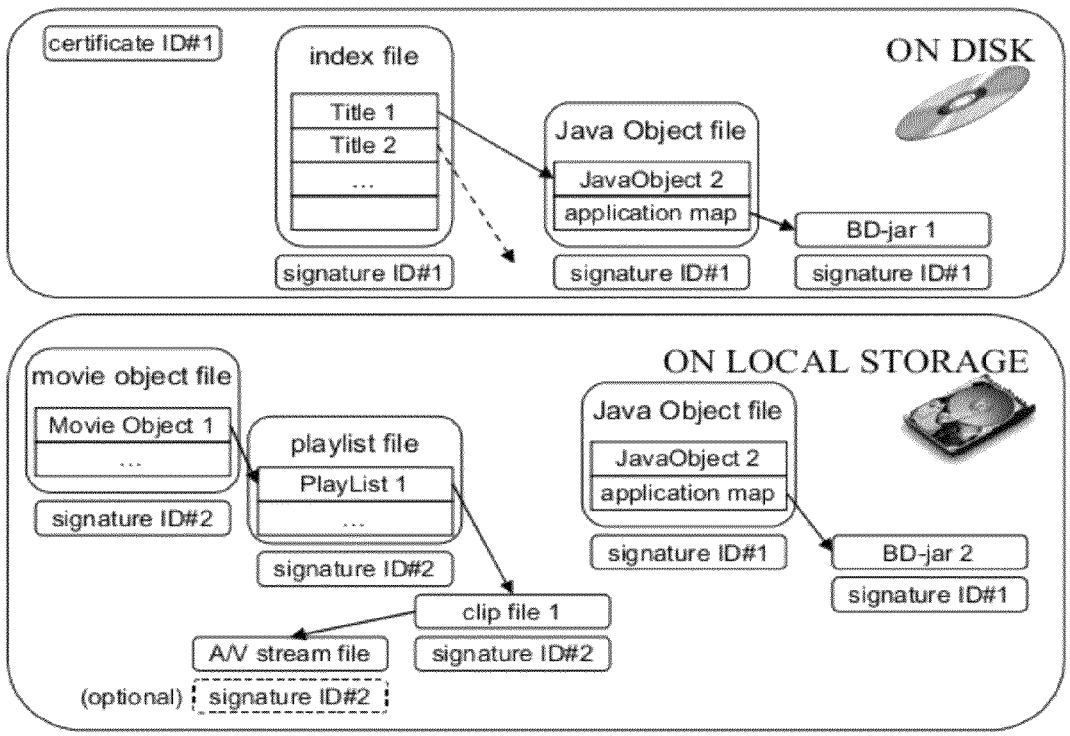
FIG. 6 certificates applied to different files residing on a removable disc and on local storage, carrying two different organization_IDs according to their mapping in a file system.

In another embodiment of the invention, the organization_ID is used with local storage, as depicted in FIG. 6. An optical disc loaded to the player instrument contains an index file, whose first title Title_1 is referencing a JavaObject file. The JavaObject file points to a BD-jar application. All files on the disc are signed and certified by the same identifier organization_ID#1, e.g. associated with the content provider who made the disc contents. For AV stream files the above-mentioned exception rules remain valid. The local storage, e.g. HDD, contains files from two different content providers. These files are signed with different signatures, depending on the content provider. E.g. a JavaObject file and a BD-jar application are signed and certified with organization_ID#1, and a MovieObject file, a PlayList file, a Clip file and an AV stream file are signed and certified with organization_ID#2.

After insertion of the disc, the virtual file system VFS is assembled according to the certificates located on the disc. In this example there is only one certificate on the disc, namely organization_ID#1, and therefore according to the present invention only such files are included into the VFS that are also certified with the matching identifier organization_ID#1. All other files remain invisible and inaccessible during the life cycle of the VFS. As the local storage in this case contains an update for the JavaObject file, i.e. a JavaObject file with the same name and same identifier (organization_ID#1) in its signature signature_ID#1, it supersedes the one on disc, and the Java application BD-jar2 from HDD is run instead of the original Java application from disc.

As this example shows, the usage of an organization_ID within a certification that rules the generation of a virtual file system significantly improves the security for local storage, by prohibiting any uncontrolled data combination that might otherwise be possible with data coming from the local storage. An application generating data on local storage has to sign the generated files, and the signature has to point to the disc certification that carries the appropriate organization_ID. Otherwise the application will not be able to find the newly generated data again on the local storage. If the generated data is held in cache, it may remain usable for the VFS until the VFS is destroyed, which happens e.g. when the disc is removed from the player, when the player is switched off, when another title from the disc is selected or upon other events. The next time when the VFS is compiled, only such data from local storage will be included in the binding that are certified with the correct organization_ID.

This leads to the effect that data that are relating to a particular application and are signed correspondingly may not be used by foreign applications, e.g. from other content providers.

A further aspect of the invention is the subdivision of organization_ID into an organization structure. This can be done by adding further identifiers to the certificate, e.g. a disc ID, application ID etc. Another possibility is to use the "text" field within the "organization name" of FIG. 4. An advantage of this subdivision is that a content provider, e.g. Disney Studios, can control the access to its general-purpose files and other data that are usable by different applications, in particular when these files and data could also be usable by applications from other content providers and this should be prevented. To reach this, all authorized applications must have access to these data, while access from other (unauthorized) applications is prevented.

However, applying the corresponding certificate to those files, as described above, would require knowing the later usage in advance. A later certification, e.g. by adding a new certificate, is not possible, as it requires write access for the corresponding directories on the local storage. But these directories are not visible in the later VFS if the application then has another certificate. As a solution, it is proposed to span an umbrella in advance and decide at a later time, which application is allowed to go under this umbrella. The umbrella is spanned by the main part of the organization_ID defining a root directory.

Figure 7:
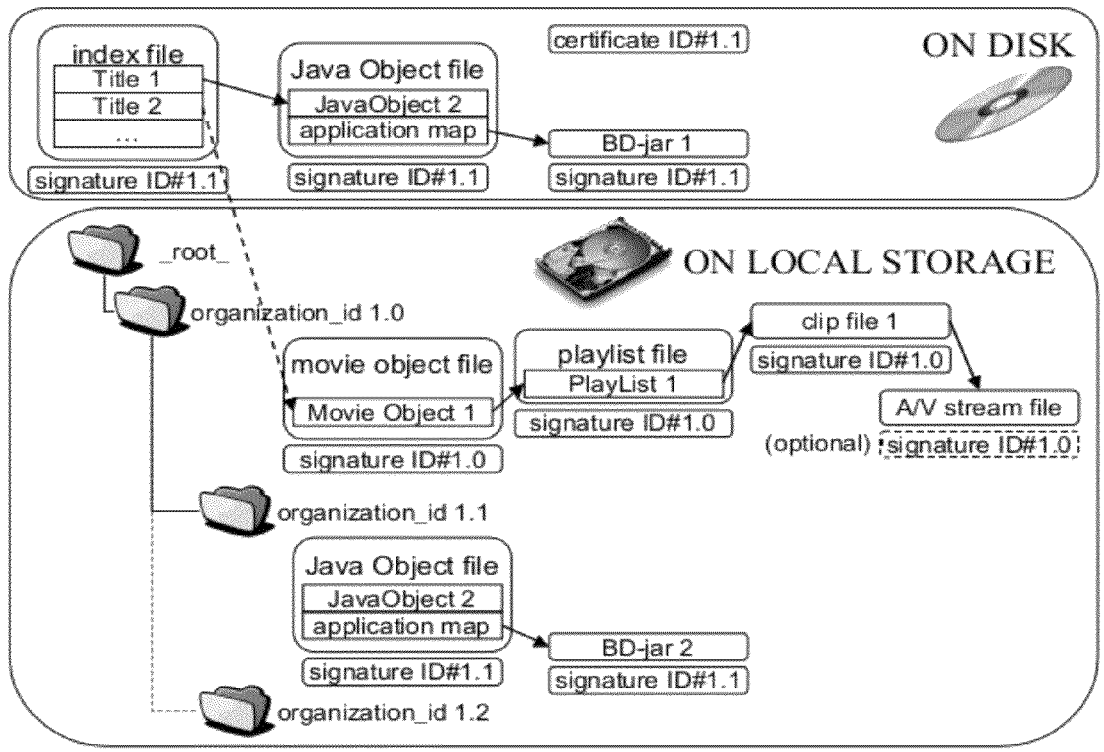
FIG. 7 subdividing an organization_ID including the resulting directory organization on local storage.

This is depicted in FIG. 7. All subdivisions are placed within a subdirectory within this root directory _root_. When generating the VFS, all files and directories within the organization directory (i.e. the "umbrella") and the own subdivision directory are included. The neighbour directories are not visible, only all data and files within the root directory. E.g. the movie object Movie_Object_1 in FIG. 7 may contain the latest movie trailers. With the shown storage location, in the directory organization_ID#1.0, it can be bound to all VFSs relating to discs from the same studio, and thus the latest movie advertisement can be started from all these discs. An optical disc certified with e.g. organization_ID#1.2 may also include the files from local storage certified with organization_ID#1.0, because the files are stored under the same root directory. It is accepted that they are stored in different subdirectories that may relate e.g. to different discs or different titles, but from the same "organization". This organization can generally be any certification authority, as described above.

One aspect of the invention is to utilize an identifier, or organization_ID, to control the assembling of a virtual file system VFS.

One aspect of the invention is to apply the assembly of a virtual file system controlled by an identifier, or organization_ID, to a (local) storage medium, such as a HDD, wherein the respectively valid identifier that controls the assembly process is retrieved from a removable storage medium.

One aspect of the invention is to apply the identifier-controlled assembly of a virtual file system to an optical disc, wherein the respectively valid identifier is retrieved from the currently presented title on said disc.

One aspect of the invention is to store the identifier, or organization_ID, within a certificate that is defined within the security system framework.

One aspect of the invention is to subdivide a main directory tree on a local storage medium, wherein the main directory tree is certified with an organization_ID, into an organization structure including a plurality of subdirectories, and allowing access to a subdirectory by all other subdirectories of the same main directory.

One aspect of the invention is to sign and certify MovieObjects and/or JavaObjects.

One aspect of the invention is to create signatures for newly created files stored on a local storage medium, wherein the signatures point to the certification and identifier located on a removable storage medium, in particular an optical disc.

There may exist a rule saying e.g. that all AV stream files stored on local disc must be signed and certified with a particular organization_ID. This ensures that unauthorized manipulation of stream files on the local storage medium is impossible. This is possible when generating a face AV stream file that matches any existing clip file. Other security mechanisms can be taken to ensure this, e.g. encryption of the AV stream files. There may also exist a rule e.g. demanding all AV stream files to be encrypted by the same key, wherein the key is located on the removable disc, and that all not-encrypted AV stream files cannot be presented by the instrument.

Figure 8:
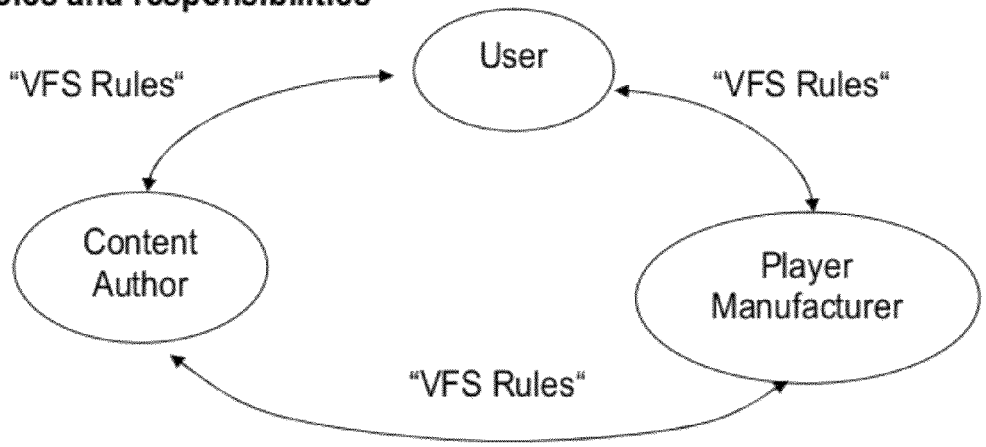
FIG. 8 roles and responsibilities between involved parties.

FIG. 8 shows the dependencies between users, content providers and player manufacturers. They all should agree on a set of rules for generating a Virtual File System VFS.

Figure 9:
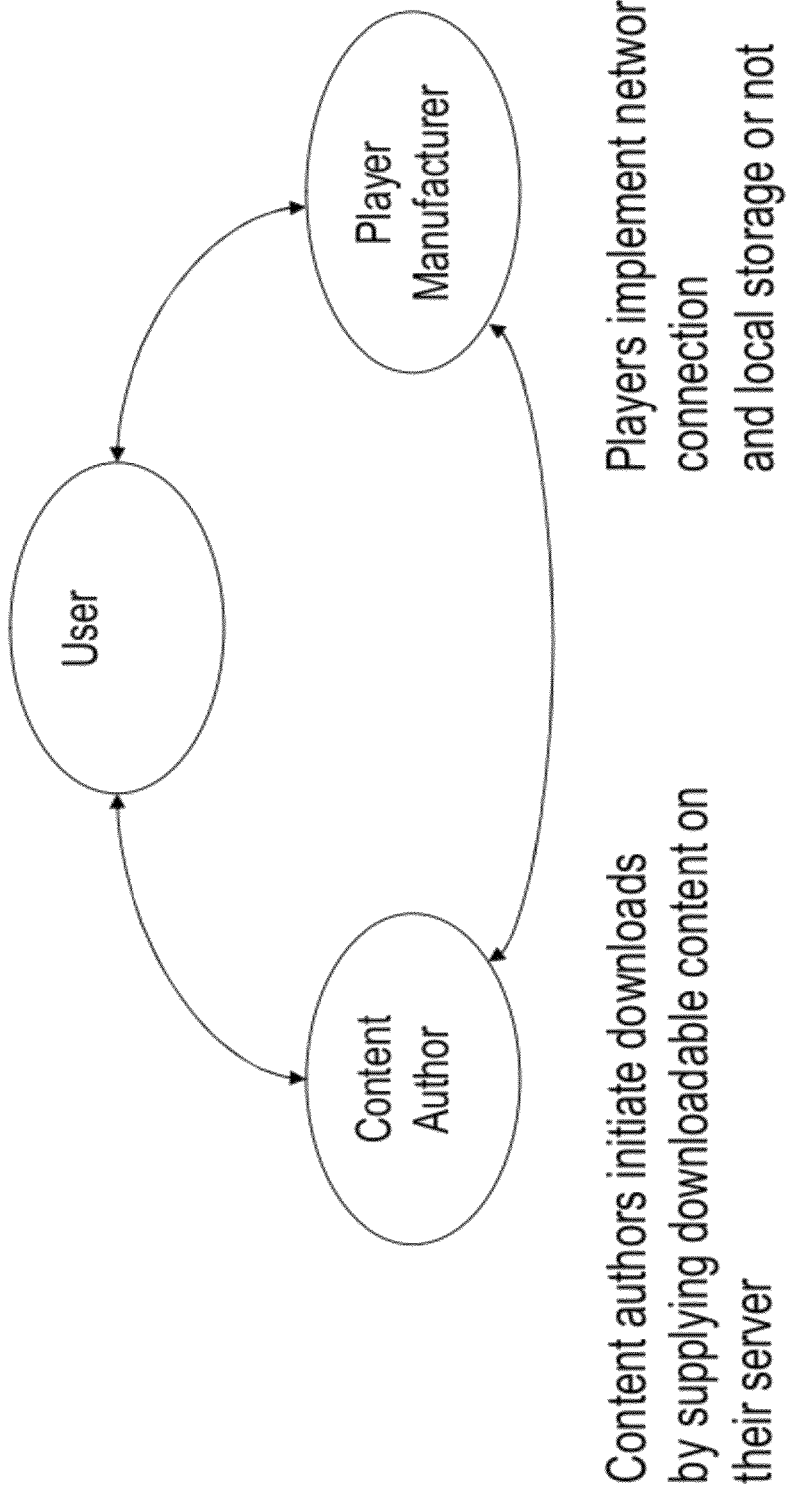
FIG. 9 roles and responsibilities for download.

FIG. 9 shows aspects to be considered for downloading additional content e.g. via the Internet. Content authors may initiate such downloads, e.g. by putting a notification message on a dedicated Internet site. Upon a defined event, e.g. when the user inserts the disc related to the additional content into his player, or when he starts a particular related application, and when further the user allowed network access for the player and the player supports this functionality, then the additional content may be downloaded, verified and stored as described above.

Figure 10:
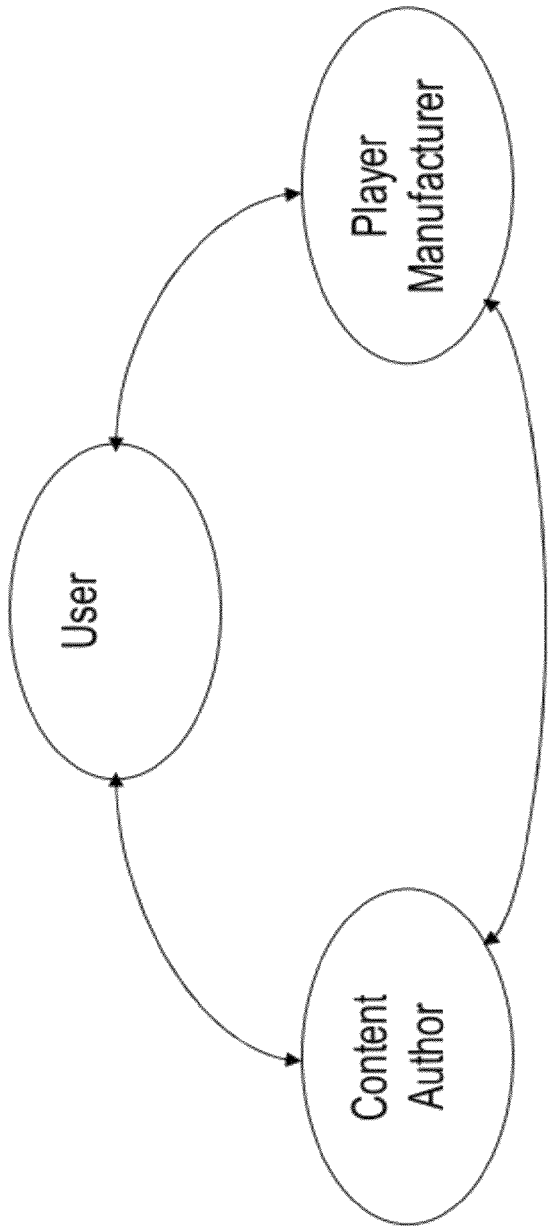
FIG. 10 roles and responsibilities for the construction of the Virtual File System.

FIG. 10 shows that and how the involved parties may affect the construction of the virtual file system. The user can set preferences, the player manufacturer can provide the required software and/or hardware functions, e.g. a memory card drive for storing additional content on a memory card, and the content author may use the agreed VFS rules for some or all of the discs he sells.

Figure 11:
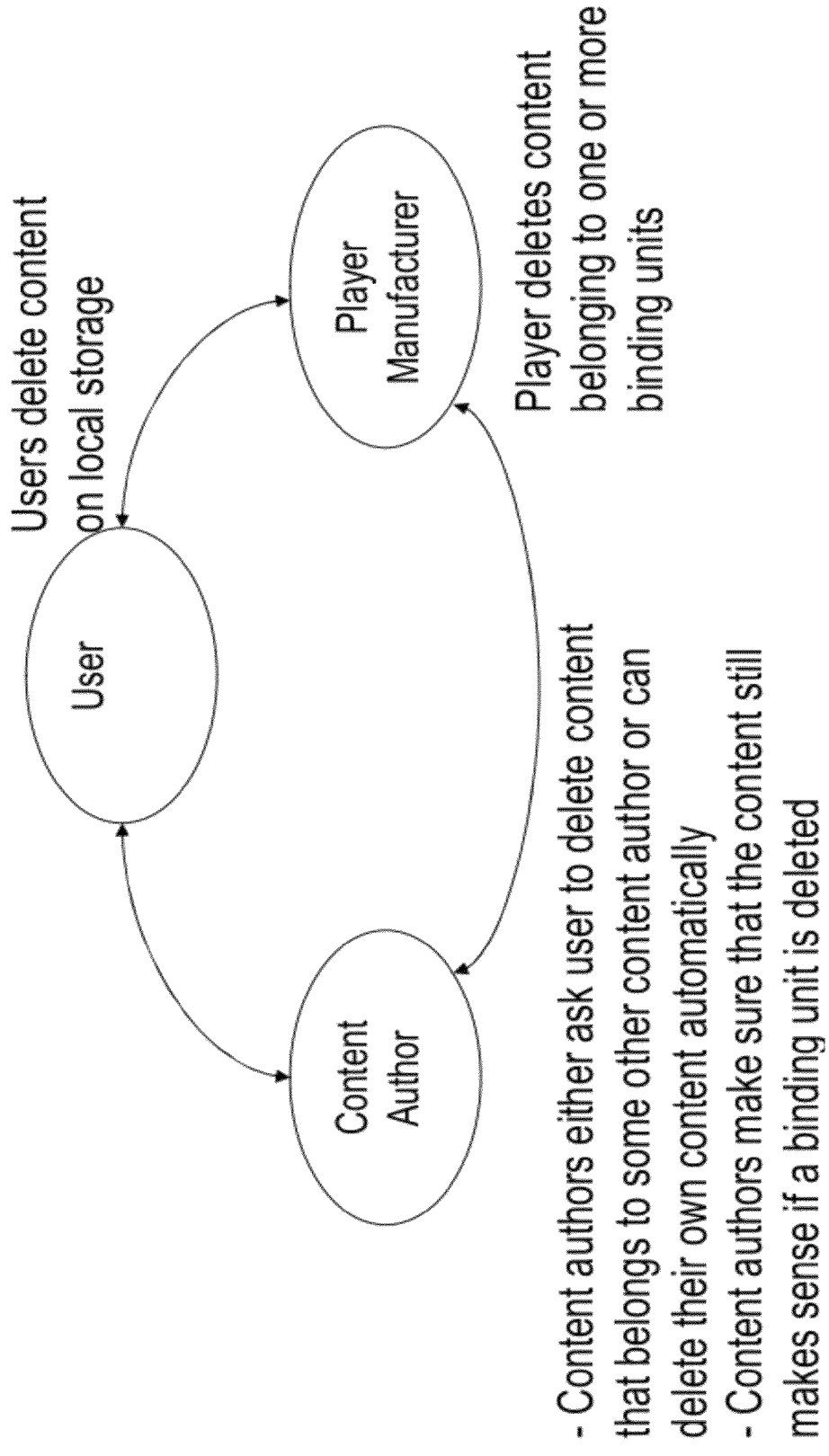
FIG. 11 roles and responsibilities for local delete operations.

FIG. 11 depicts various aspects to be considered when deleting downloaded content. E.g. a player may be programmed such that it automatically deletes stored content that belongs to one or more binding units, if the authorized content author (the one who has the respective identifier) sends a corresponding signal. This may be used e.g. when a movie trailer is outdated or similar.

In FIG. 12 the question when to construct a virtual file system is discussed.

When the VFS in constructed upon disc insertion, this is the easiest solution from the player implementation point of view, but then it is not possible to generate or download data while the disc is inserted.

A second possibility is to construct the VFS when either the disc is inserted or a new title is selected. This is a good solution from the users point of view, because when a title is changed there is an interruption, during which the new VFS can be generated without disturbing the user.

A third, possibility is to construct the VFS always when playback starts. This however requires, when MovieObjects or JavaObjects should be included in the binding, different mechanisms than when just PlayLists, Clipinfo and MPEG2-TS (transport stream) files shall be included. These are on a different logical level, and new MovieObject or JavaObject upon playback start may lead to confusion about which files are valid.

A fourth possibility can be applied when a programmable platform is available, such as a Java Virtual Machine JVM, namely to generate the VFS dynamically upon an Application Program Interface (API) call.

The construction of a VFS is called "binding". FIG. 13 discusses what would be a good binding unit, i.e. for which unit or entity a binding shall be valid: a binding may refer to a disc, or to a title from a particular disc, or to a playlist referring to a title from a particular disc, or dynamically. The preferred binding unit is per title, because the VFS framework is title based.

As mentioned above, the integrity of the VFS must be checked. This is discussed in FIG. 14. The integrity check is preferably done every time before constructing a VFS. Goals are to separate contents from e.g. different studios and prevent usage of corrupted or invalidated data.

Figure 15:
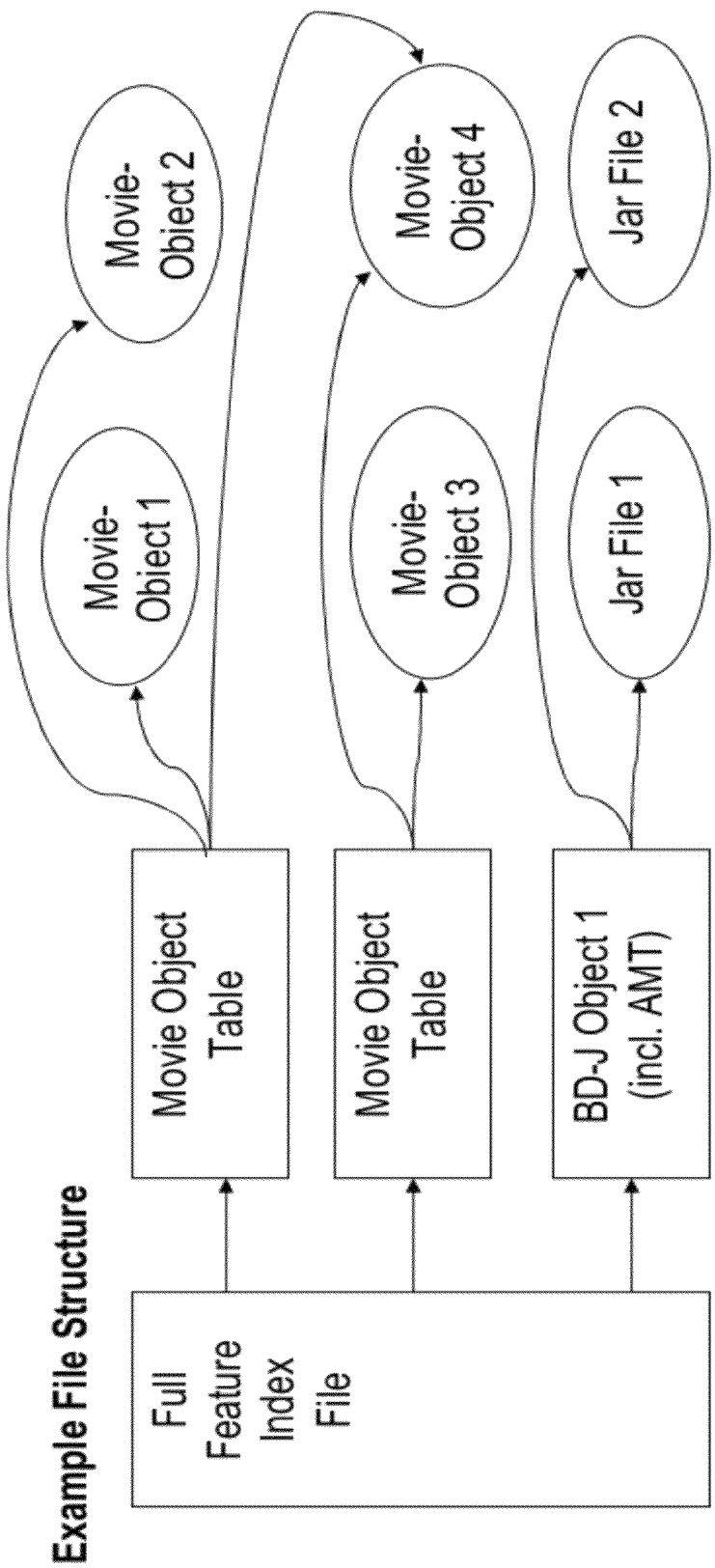
FIG. 15 an exemplary file structure.

FIG. 15 shows an example file structure. A full feature index file contains references to a plurality of titles being movie object tables and/or Java objects. Each Java object includes an Application Management Table AMT. The movie object tables and the AMTs point to MovieObjects or Java archive files respectively, which may be included in the VFS according to the invention. A MovieObject may be e.g. a video scene, subtitle stream, graphic animation stream etc.

Figure 16:
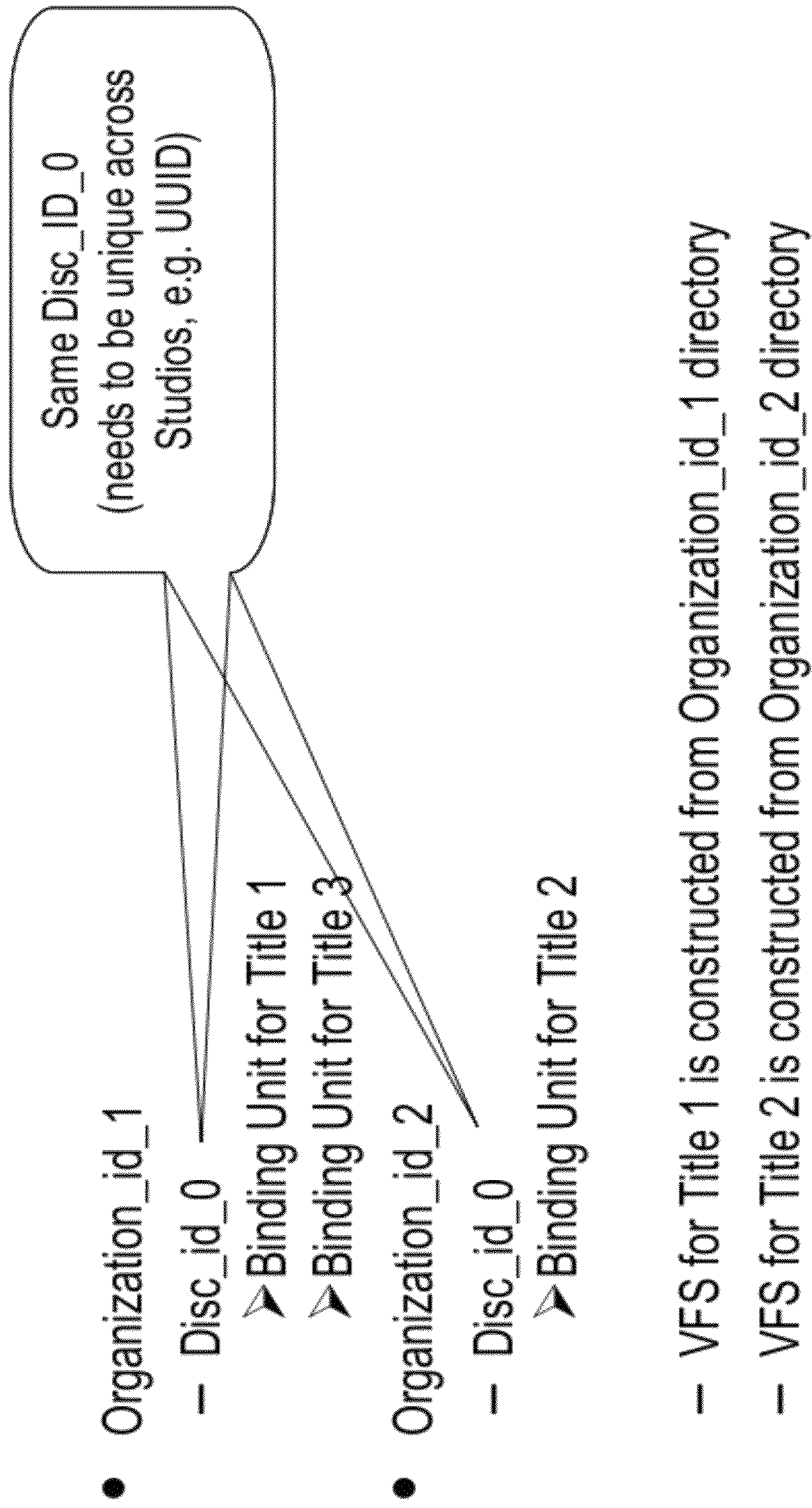
FIG. 16 binding of content from multiple providers.

FIG. 16 shows how content from different providers can be bound to a VFS, namely if the providers use e.g. the same disc identifier Disc_ID_0. It can e.g. be a UUID.

FIG. 17 explains how shared trailers can be associated with read-only discs.

The invention can be used for recording and/or playback devices for removable storage media that have access to a further rewritable storage medium, such as a HDD. The invention is useful e.g. for high-density data carriers such as Blu-ray discs.

The invention claimed is:

1. A computer-implemented method for generating a virtual file system using first data from a first read-only storage medium and second data from a second non-transitory storage medium, wherein the first read-only storage medium comprises a plurality of titles, and a title encompasses at least one movie object or Java object, wherein a movie object describes a video scene, subtitle stream or graphic animation stream and wherein a Java object describes a Java executable file that may run on a Java Virtual Machine and comprises an Application Management Table that points to a Java archive file, the method comprising:

determining from the first read-only storage medium a first identifier;

selecting a title from said plurality of titles, and upon said selecting a title performing steps of determining that on the second storage medium, in a first directory according to said first identifier, one or more files related to the selected title and the first identifier are available and authorized, and compiling a virtual file system that comprises files from the first read-only storage medium and that further comprises from the second storage medium only said files related to the selected title and the first identifier, wherein said determining that a file is authorized comprises steps of retrieving from the first or the second storage medium a signature of the file, decrypting the retrieved signature using a public key of an asymmetric encryption method, and using the decrypted signature for verifying that the file is authorized, and wherein said Java executable file when running on the Java Virtual Machine creates or writes new files under the first directory;

the method further comprising the steps of retrieving from the first read-only storage medium a second identifier, wherein said determining that on the second storage medium one or more files related to the selected title and the first identifier are available comprises determining that one or more of said files available on the second storage medium are located either in a first directory according to the first identifier or in a second directory according to the second identifier, the second directory being located in said first directory; and retrieving a certificate from the first or the second storage medium, and decrypting the certificate, whereby said public key is obtained.

* * * * *